(12) United States Patent
Grimm et al.

(10) Patent No.: US 7,454,502 B2
(45) Date of Patent: Nov. 18, 2008

(54) SYSTEM FOR TRANSFERRING STANDBY RESOURCE ENTITLEMENT

(75) Inventors: Randall Lane Grimm, Rochester, MN (US); David Otto Lewis, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 694 days.

(21) Appl. No.: 10/728,016

(22) Filed: Dec. 4, 2003

(65) Prior Publication Data

US 2005/0125521 A1  Jun. 9, 2005

(51) Int. Cl.
G06F 15/173 (2006.01)
G06F 15/16 (2006.01)
G06F 7/00 (2006.01)
G06F 17/30 (2006.01)
G06F 15/00 (2006.01)
G06F 11/00 (2006.01)
G06F 9/46 (2006.01)

(52) U.S. Cl. .................. 709/226; 709/224; 709/225; 709/239; 709/201; 709/202; 709/203; 709/205; 709/229; 707/10; 707/202; 712/28; 714/2; 718/100

(58) Field of Classification Search .................. 709/226
See application file for complete search history.

(56) References Cited

U.S. PATENT DOCUMENTS

| 5,938,732 | A  | * | 8/1999  | Lim et al. ............... 709/229 |
| 6,260,068 | B1 | * | 7/2001  | Zalewski et al. ......... 709/226 |
| 2004/0117476 | A1 | * | 6/2004 | Steele et al. ............ 709/224 |
| 2004/0199632 | A1 | * | 10/2004 | Romero et al. .......... 709/226 |

* cited by examiner

Primary Examiner—Ashok B. Patel
Assistant Examiner—Kishin G Belani
(74) Attorney, Agent, or Firm—Wood, Herron & Evans, LLP

(57) ABSTRACT

A method for transferring entitlement to standby resources between respective computers. Standby resources are made available at a destination computer by rendering unavailable corresponding resources at a source computer. As such, the aggregate number of available standby resources may remain unchanged, but the distribution of the availability may be reapportioned according to operational requirements. Where desired, this transfer of entitlement may be accomplished automatically, dynamically and/or in a secure manner.

15 Claims, 5 Drawing Sheets

SYSTEM FOR TRANSFERRING STANDBY RESOURCE ENTITLEMENT

FIELD OF THE INVENTION

The present invention relates to computing systems, and more particularly, to managing temporary resources within a data processing environment.

BACKGROUND OF THE INVENTION

Computer resource requirements for commercial and government applications often increase or otherwise fluctuate over time. For instance, a business may experience periods of peak activity that exceed comparable processing or memory requirements of other periods. In another scenario, sales or employee growth may similarly burden existing computing resources with increased requirements. When faced with these increased resource demands, a user would conventionally have to purchase new hardware resources capable of accommodating the elevated computing needs. Such purchase requirements can represent a major, if not preclusive, expenditure for a user, who may have insufficient capital or time to react to rapid growth requirements.

To this end, computing architectures such as the "capacity on demand" design, developed by International Business Machines Corporation, allow customers to effectively "rent" resources such as processors on an as-needed basis. More particularly, a customer may temporarily enable standby processors that are initially dormant within their machine. Where desired, the standby processors are not included in the up front, baseline cost of the machine. As such, for a relatively smaller initial capital investment, a customer may activate and deactivate standby processors as needed for a fee.

Such selective utilization of standby processors provides customers with another layer of customized processor access and optimized usage. Conversely, capacity on demand systems supply system providers with a creative way to satisfy customer performance and cost requirements, while additionally providing an increased revenue source.

Despite the flexibility provided by the capacity on demand applications, the economies associated with standby resources generally remain confined to their host computer. That is, the standby resources are typically constructed integrally with their respective computer. Thus, it is often unfeasible to physically remove and reapportion standby processors as between different computers. As a consequence, a scenario can develop where a user having two computers with standby resources must activate additional standby resources on a first computer to handle an increased workload. At the same time, active standby resources of the second computer may remain underutilized. Such a situation may occur where computers are geographically dispersed and/or are subjected to peak work loads at different times. For instance, a company's computers may operate in different time zones. As such, while the user may theoretically have enough active standby resources between both computers to handle the workload of the computers, the standby resources cannot be practically physically distributed amongst the computers in proportion to their respective workloads to address the work requirement discrepancy.

In such a circumstance, having to activate additional standby resources on the first computer negatively affects production quotas and can be viewed by the customer as frustrating and wasteful. To mitigate expenses, users meticulously plan work allocations as between computers, where possible. However, it is typically very difficult to predict work requirements in most applications. Another effort to limit the activation of additional standby processors includes load balancing. Load balancing involves the transfer of work between computers. Ideally, the workload of an overburdened computer can be redistributed to a computer having underutilized standby resources. However, even where feasible, the electronic transfer of data is time consuming, inconvenient and inefficient. As a consequence, the user is often relegated to activating additional standby resources at the computer experiencing elevated workloads, despite having available active resources at another computer. Consequently, improved mechanisms are needed for addressing varying workloads within capacity on demand systems.

SUMMARY OF THE INVENTION

One embodiment consistent with the principles of the present invention includes an apparatus, method, and program product configured to transfer entitlement to standby resource availability in a manner that addresses the limitations of the prior art. That is, entitlement, or availability, to respective standby resources of computers is reallocated or otherwise transferred to enable greater flexibility in utilizing standby resources within a computer network. For instance, processes consistent with an embodiment of the invention make standby resources available at a destination computer by rendering unavailable corresponding resources at a source computer. As such, the aggregate number of available standby resources may remain unchanged, but the distribution of the availability may be reapportioned according to operational requirements. This transfer may be accomplished without requiring physical transfer of a standby resource or a workload associated with a respective computer. This feature thus promotes greater efficiency and cost savings.

Where desired, the transfer of entitlement is accomplished automatically and/or dynamically in response to changing workload requirements and resource availability. In any case, processes consistent with the invention may update and otherwise maintain an entitlement database for billing, transfer eligibility and other accountability considerations. Credit signatures may be generated, encoded and verified to ensure that standby resources have actually been relinquished and/or made available. Activation codes may automatically update respective availabilities to standby resources at each computer.

Embodiments consistent with the principles of the present invention may be realized in a number of different environments and scenarios, to include those comprising an entitlement application/computer that manages transfer processes between the source and destination computers. Such an entitlement computer may include a brokerage or web-based application configured to sell and redistribute standby resource availability to generate additional revenues and operating flexibility.

The above and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF SPECIFIC EMBODIMENT

An embodiment of the present invention includes an apparatus, program product and method for transferring entitlement to standby resources as between respective computers. In one embodiment, processes consistent with the invention make standby resources available at a destination computer by rendering unavailable corresponding resources at a source computer. As such, the aggregate number of available standby resources may remain unchanged, but the distribution of the availability may be reapportioned according to operational requirements. Where desired, this transfer of entitlement may be accomplished automatically, dynamically and/or in a secure manner. Hardware environments suited for execution of such an embodiment are illustrated in FIGS. 1-3B.

Hardware and Software Environment

Figure 1:
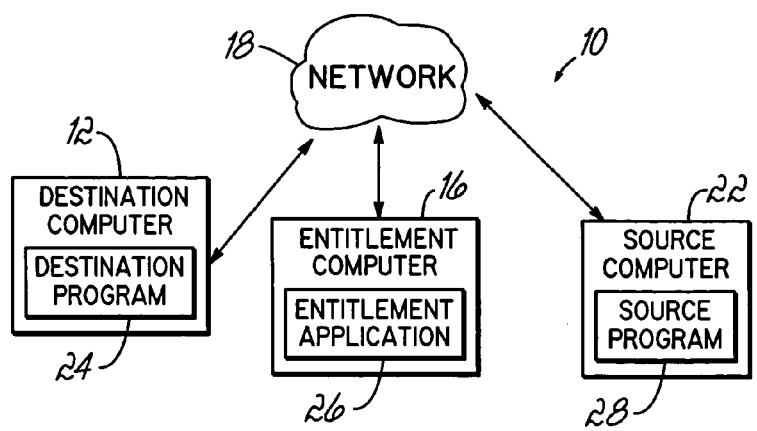
FIG. 1 is a block diagram of a networked computer system consistent with the invention.

Turning to the Drawings, wherein like numbers denote like parts throughout the several views, FIG. 1 illustrates a computer system 10 suited to implementing standby resource entitlement transfers in a manner consistent with the invention. Computer system 10 is illustrated as a networked computer system including one or more destination and source computers 12 and 22, respectively, (e.g., desktop or PC-based computers, workstations, machines with a processor, etc.). As shown in the block diagram of FIG. 1, the destination computer 12 includes a destination program 24. Computers 16 and 22 are similarly configured, albeit with either an entitlement application 26 or a source program 28, respectively. As discussed below in detail, such program code 24-28 is typically configured to initiate or otherwise execute processes for transferring resource entitlement in a manner that is consistent with the principles of the present invention. While the program code 24-28 may reside on a source, destination, or entitlement computer as shown in FIG. 1, one skilled in the art will appreciate that embodiments consistent with the principles of the present invention may employ program code resident at only one, or any number of locations in a system 10.

The computers 12 and 22 are coupled or otherwise in communication with each other and/or an entitlement computer 16 (e.g., a PC-based server, a minicomputer, a midrange computer, a mainframe computer, etc.) through a network 18. Network 18 typically represents a networked interconnection, including, but not limited to local-area, wide-area, wireless, and public networks (e.g., the Internet). One skilled in the art, however, will appreciate that network connection 18 may include or otherwise be augmented or replaced by any conventional communications mechanism, including email, postal mail, telephonic lines, facsimiles, etc. Moreover, any number of computers and other devices may be networked through network 18.

Figure 2:
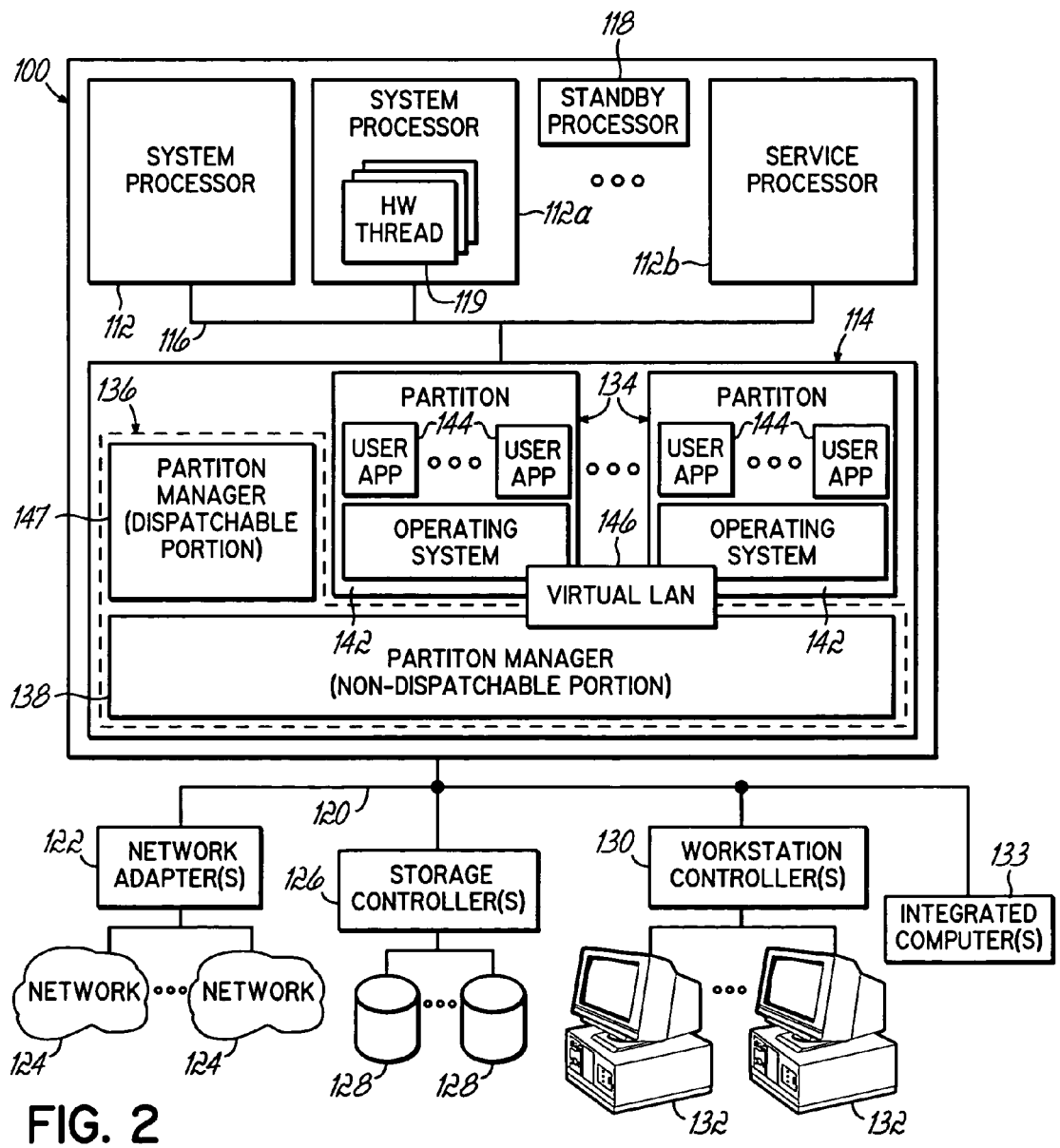
FIG. 2 is a block diagram of the primary software components and resources in a computer of FIG. 1.

Each computer 12, 16 and 22 may represent practically any type of computer, computer system or other programmable electronic device. Moreover, each computer 12, 16 and 22 may be implemented using one or more networked computers, e.g., in a cluster or other distributed computing system. As an illustration of one particular computer that may implement the herein-described functionality, FIG. 2 illustrates an implementation of the destination computer 12 of FIG. 1 as a logically partitioned computer system 100. Computer 100 of FIG. 2 generically represents, for example, any of a number of multi-user computers such as a network server, a midrange computer, a mainframe computer, etc., e.g., an IBM eServer iSeries computer, within which logical partitioning is utilized. However, it should be appreciated that the invention may be implemented in other computers and data processing systems, so the invention is not limited to this particular implementation.

Computer 100 of FIG. 2 generally includes one or more processors 112 coupled to a memory 114 via a bus 116. Each processor 112 may be implemented as a single threaded processor, or as a multithreaded processor, such as with processor 112a, which is shown incorporating a plurality of hardware threads 119. For the most part, each hardware thread 119 in a multithreaded processor 112a is treated like an independent processor by the software resident in the computer. In this regard, for the purposes of this disclosure, a single threaded processor will be considered to incorporate a single hardware thread, i.e., a single independent unit of execution. It will be appreciated, however, that software-based multi-threading or multitasking may be used in connection with both single threaded and multithreaded processors to further support the parallel performance of multiple tasks in the computer.

In addition and as is also illustrated in FIG. 2, one or more of processors 112 (e.g., processor 112b) may be implemented as a service processor, which is used to run specialized firmware code to manage system initial program loads (IPL's), and to monitor, diagnose and configure system hardware. Generally, computer 100 will include one service processor and multiple system processors, which are used to execute the operating systems and applications resident in the computer, although the invention is not limited to this particular implementation. In some implementations, a service processor may be coupled to the various other hardware components in the computer in a manner other than through bus 116.

As shown in FIG. 2, system processors may include standby processors 118, in addition to other standby resources. When activated, these standby processors 118 may function within the computer as any other processor 112. An additional type of standby resource that may be utilized in computer 100 in addition to or in lieu of standby processors 118 is an integrated computer 133, e.g., integrated card-based computers such as Integrated xSeries servers available from IBM. An Integrated xSeries server typically provides an Intel-based server on a PCI card and running a version of a Microsoft Windows operating system, which is capable of being plugged into a PCI slot in an IBM iSeries server to leverage the iSeries server's system management, communication and storage resources, while otherwise operating as a standalone Windows-based server. Other forms of integrated computers, whether or not card-based, may be used consistent with the invention.

As discussed herein, a suitable standby resource that is consistent with the principles of the present invention may include an allocatable component or function of a computing environment. As such, exemplary standby resources may include processors, direct access storage devices (DASD) or other memory, plugin cards, input/output controllers, adaptors or devices and other hardware devices, among other components. Standby resources may also comprise multiple such components, e.g., processor cards including multiple processors coupled to local memory and other components, e.g., for a NUMA-based architecture. In the context of the present invention, one skilled the art will appreciate that such standby resources may be present on both the source and destination computers.

Memory 114 may include one or more levels of memory devices, e.g., a DRAM-based main storage, as well as one or more levels of data, instruction and/or combination caches, with certain caches either serving individual processors or multiple processors as is well known in the art. Furthermore, memory 114 is coupled to a number of types of external devices via a bus 120, e.g., one or more network adapters 122 (for interfacing the computer with network(s) 124), one or more storage controllers 126 (for interfacing the computer with one or more storage devices 128) and one or more workstation controllers 130 (for interfacing with one or more terminals or workstations 132 via a plurality of workstation adapters).

FIG. 2 also illustrates in greater detail the primary software components and resources utilized in implementing a logically partitioned computing environment on computer 100, including a plurality of logical partitions 134 managed by a partition manager 136. Any number of logical partitions may be supported as is well known in the art, and the number of logical partitions resident at any time in a computer may change dynamically as partitions are added or removed from the computer.

In the illustrated IBM eServer-based implementation, partition manager 136 is comprised of two layers of program code. The first, referred to herein as a non-dispatchable portion 138, is implemented within the firmware, or licensed internal code (LIC), of computer 100, which is utilized to provide a low level interface to various hardware components while isolating higher layers, e.g., the operating systems, from the details of the hardware access. The firmware may also communicate with a service processor such as service processor 112b. The non-dispatchable portion 138 provides many of the low level partition management functions for computer I 00, e.g., page table management, etc. The non-dispatchable portion 138 also has no concept of tasks, and is accessible principally via function calls from higher layers of software.

The second layer of program code in partition manager 136 is referred to herein as a dispatchable portion 147. In contrast to non-dispatchable portion 138, which has no concept of tasks, is run with relocation off, and is accessible via function calls from higher layers of software, the dispatchable portion 147 has the concept of tasks (like any operating system), and is run with relocation on. The dispatchable portion typically executes in much the same manner as a partition, except that it is hidden from the user. The dispatchable portion generally manages higher level partition management operations such as creating and deleting partitions, concurrent I/O maintenance, allocating processors, memory and other hardware resources to various partitions 134, etc.

Each logical partition 134 is typically statically and/or dynamically allocated a portion of the available resources in computer 100, which may include either or both of dedicated and standby resources. For example, each logical partition may be allocated one or more processors 112 and/or one or more hardware threads 119, as well as a portion of the available memory space. Logical partitions can share specific hardware resources such as processors, such that a given processor is utilized by more than one logical partition. In the alternative hardware resources can be allocated to only one logical partition at a time.

Additional resources, e.g., mass storage, backup storage, user input, network connections, integrated computers and the I/O adapters therefor, are typically allocated to one or more logical partitions in a manner well known in the art. Resources may be allocated in a number of manners, e.g., on a bus-by-bus basis, or on a resource-by-resource basis, with multiple logical partitions sharing resources on the same bus. Some resources may even be allocated to multiple logical partitions at a time.

Each logical partition 134 utilizes an operating system 142 that controls the primary operations of the logical partition in the same manner as the operating system of a non-partitioned computer. For example, each operating system 142 may be implemented using the OS/400 operating system available from International Business Machines Corporation.

Each logical partition 134 executes in a separate, or independent, memory space, and thus each logical partition acts much the same as an independent, non-partitioned computer from the perspective of each user application (user app) 144 that executes in each such logical partition. As such, user applications typically do not require any special configuration for use in a partitioned environment.

Given the nature of logical partitions 134 as separate virtual computers, it may be desirable to support inter-partition communication to permit the logical partitions to communicate with one another as if the logical partitions were on separate physical machines. As such, in some implementations it may be desirable to support a virtual local area network (LAN) 146 in non-dispatchable portion 138 to permit logical partitions 134 to communicate with one another via a networking protocol such as the Ethernet protocol. Other manners of supporting communication between partitions may also be supported consistent with the invention.

It will be appreciated that other logically-partitioned environments may be utilized in a manner that is consistent with the invention. For example, rather than utilizing a dispatchable portion 147 that is separate from any partition 134, the functionality of the dispatchable portion may be incorporated into one or more logical partitions in the alternative. It will further be appreciated that the specific resources shown in FIG. 2 are merely exemplary in nature, and that any combination and arrangement of resources may be allocated to any logical partition in the alternative. Moreover, it will be appreciated that in some implementations resources can be reallocated on a dynamic basis to service the needs of other logical partitions.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention.

Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, magnetic tape, optical disks (e.g., CD-ROMs, DVDs, etc.), among others, and transmission type media such as digital and analog communication links.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Figure 3A:
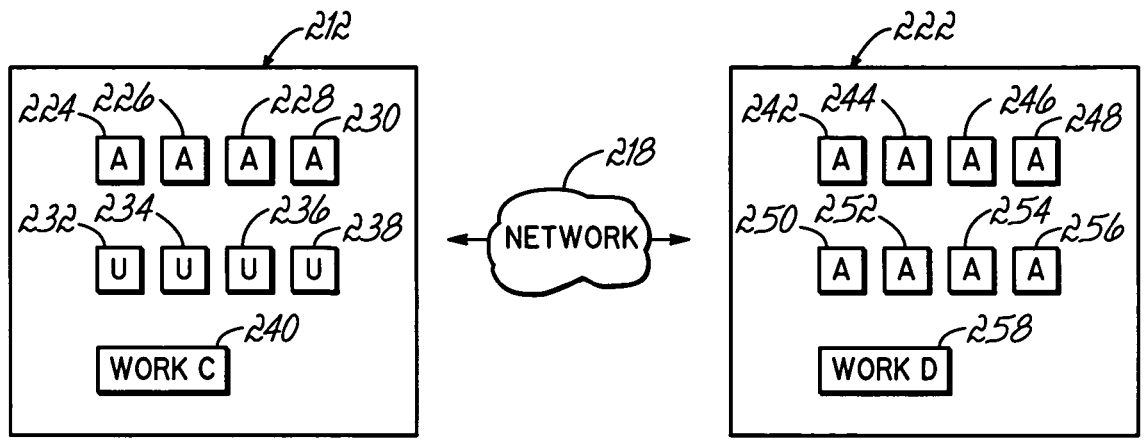
FIG. 3 is block diagram showing the respective availability of standby resources at different instances and within a networked computer system consistent with the invention.
Figure 3B:
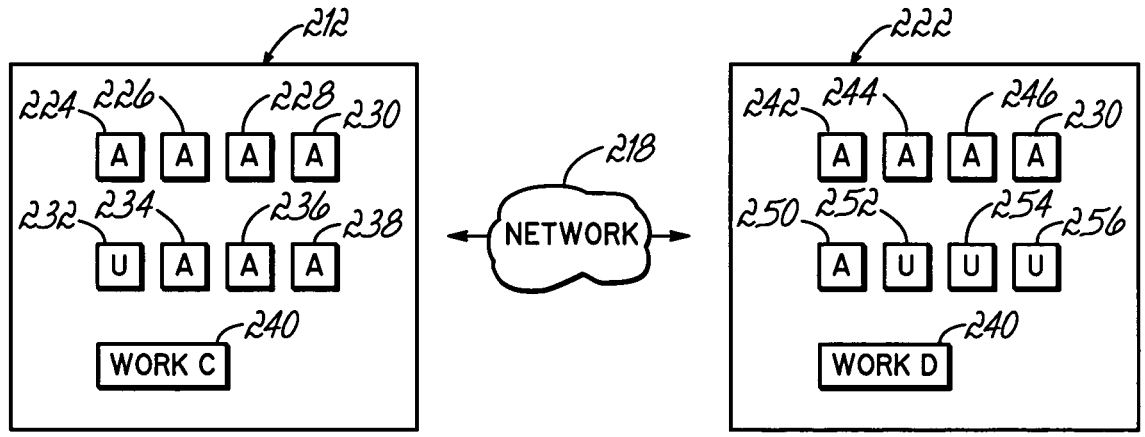

FIG. 3A shows a computer system 200 comprising destination and source computers 212 and 222, respectively, that may be similar to those computers 12 and 22 shown in FIG. 1. FIG. 3B shows the same computer system 200 as in FIG. 3A, but operating at a different point in time. As in FIGS. 3A and 3B, the computer system 200 may include a communication link, or connection 218. An exemplary network connection 218 may include Internet, cabling, wireless connections, facsimile, telephone lines, or virtually any other link or mechanism for communicating a desire to make a standby resource available. As such, the connection of another embodiment may include conventional postal communications and processes.

As above, each computer 212 and 222 may include a mechanism having a processor and one or more standby resources 224-238 and 242-256, respectively. One skilled in the art will appreciate that computers 212 and 222 may additionally include dedicated such resources, such as program code for transferring entitlement of standby resources. However, only standby resources are shown in FIGS. 3A and 3B for illustrative purposes. A standby resource for purposes of this specification may include a processor, DASD (Direct Access Storage Device), other memory, a port, or virtually any hardware or software resource that can be enabled and disabled. In commercial terms, a suitable resource may include hardware or software that can be paid for and not used.

Computers 212 and 222 also include respective workloads 240 and 258, as shown in FIG. 3A. The standby resources 224-238 are typically used to process a workload C 240. For instance, a standby DASD resource 230 may store information comprising workload C 240 on a magnetic disk. In another example, a standby processor 224 may execute programmatic jobs comprising work C240. In any case, the respective workloads 240 and 258 of one or more of the computers 212 and 222 may fluctuate over time. Consequently, there may be times when the demands associated with workload C 240 require additional resources. That is, there are times when it is desirable to activate standby resources 232-238. In accordance with the principles of the present invention, it is possible to transfer entitlement to standby resources from the source computer 222 to the destination computer 212. Of note, it is thus unnecessary to transfer workload C 240 to another computer 222 having more active resource availability.

FIGS. 3A and 3B show such a scenario where a destination computer 212 requires additional resource availability to process workload C 240. The destination computer 212 includes standby resources 232-238 that are temporarily inactive, or unavailable. For instance, a customer operating destination computer 212 may not have paid to have the standby resources 232-238 become available. Given the elevated demands of workload C 240, however, it is now desirable for the computer 212 to have those standby resources 232-238 become available. Computer 222 also has standby resources 242-256, all of which are shown as available. For the scenario shown in FIGS. 3A and 3B, the import associated with work C 240 hypothetically has a higher priority or a greater demand than that associated with workload D 258.

FIG. 3B shows the same system 200 of FIG. 3A after an entitlement transfer in accordance with the principles of the present invention has been accomplished. As shown in FIG. 3B, standby resources 234-238 of the destination computer 212 have become available to handle workload C 240. Conversely, standby resources 252-256 of computer 222 have become unavailable. That is transfer of entitlement, or availability, of three standby resources has been programmatically initiated to the destination computer 212 from the source computer 222. In the embodiment shown in FIGS. 3A and 3B, it was unnecessary to transfer respective workloads 240 and 258 between computers 212 and 222 in order to accommodate an increased work requirement.

The various software components, resources and basic functionality illustrated in FIGS. 1-3B may be implemented in a number of manners, including using various computer software applications, routines, components, programs, objects, modules, data structures and programs. Those skilled in the art will further recognize that the exemplary environments illustrated in FIGS. 1-3B are not intended to limit the present invention. For instance, it should be appreciated that the principles of the present invention may also apply to non-partitioned environments. Additionally, while FIG. 1 shows three computers 12, 16 and 20, one skilled in the art will appreciate at only two computers may alternatively accomplish entitlement transfer processes in accordance with the principles of the present invention. Indeed, those skilled in the art will recognize that other alternative hardware and/or software environments may be used without departing from the scope of the invention.

Transferred Entitlement Processes

Figure 4:
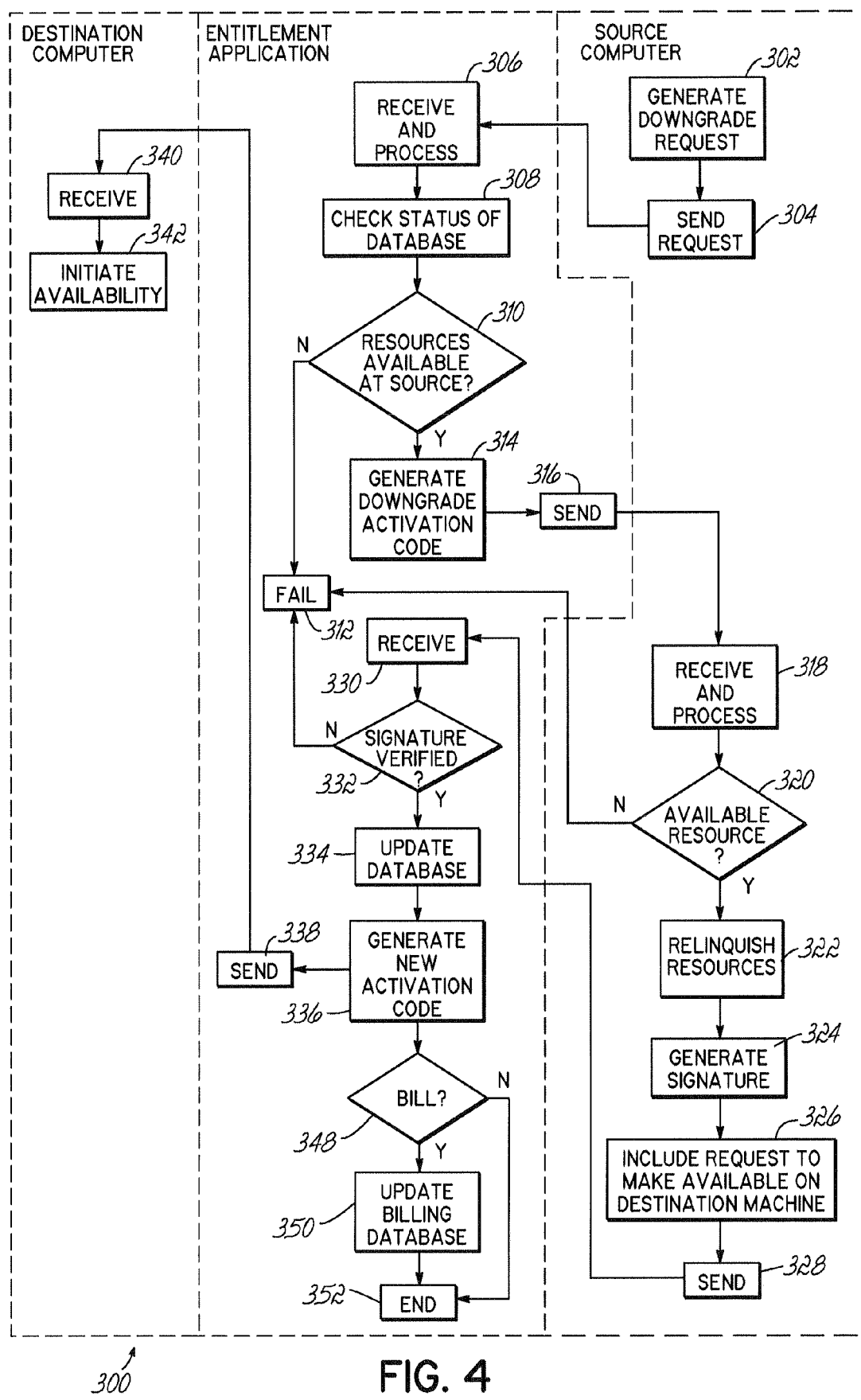
FIG. 4 is a flowchart having exemplary method steps suitable for transferring entitlement to use standby resources execution within the hardware environment of FIG. 1.

The flowchart 300 of FIG. 4 shows exemplary method steps that are consistent with the principles of the present invention and suitable for execution within the hardware environments of FIGS. 1-3B. The method steps of the flowchart 300 are particularly suited for transferring entitlement to use standby resources between two or more computers. The respective steps taken by these source and destination computers are shown in FIG. 4 in terms of their specific roles with an entitlement application. As also shown in FIG. 4, such an entitlement transfer environment may additionally include an Internet web server or other entitlement application or computer.

Turning more particularly to the flowchart 300 of FIG. 4, a request to limit the access of a source computer 222 to available standby resources 252-256 is generated at block 302. The request may include an identifier associated with the source computer 222, as well as one associated with a destination computer 212. For example, a request may include a serial number particular to a destination computer 212. Other information included in the request sent at block 304 may include a number of or the particular standby resources to be transferred. Generation of this request at block 302 may presume that a need for available standby resources has been recognized at a destination computer 212 having unavailable standby resources 234-238. In any case, the request is sent at block 304 to an entitlement application.

The request is received and processed as shown in block 306. Such processing may include verifying that a destination or source computer user is enrolled, compliant or otherwise eligible for standby resource transfer. Other processing at block 306 may include the reading of machine data to automatically determine the number of standby resources to be transferred. Still other processing at block 306 may include decryption of the request. As with all communications included in the flowcharts of FIGS. 4-6, the request generated at block 302 may be encoded or otherwise encrypted for security and other accountability purposes.

The status of a database may be checked at block 308. Such a database may include status information pertinent to available standby resources. For instance, the database may include a listing of standby resources associated with both or either the destination computer 212 and the source computer 222.

At block 310, it is determined if the standby resource availability proffered by the source computer 222 is, in fact, available for transfer according to the database. Where the database indicates that no availability of standby resources is available for transfer, the transfer attempt may fail at block 312. Where appropriate, the failed attempt may be accompanied with a message communicating the situation to one or both the destination and source computer users.

Where the availability of the standby resources of the source computer 222 is otherwise substantiated at block 310, then an activation code is generated at block 314 of FIG. 4. As discussed herein, an activation code may be unique, encrypted, and/or otherwise configured to alter availability of the standby resources. As such, "activation code" for purposes of this specification may include downgrade, upgrade and/or deactivation processes where appropriate. At block 316 of FIG. 4, for instance, the activation code sent to the source computer 222 causes the source computer 222 to relinquish availability to standby resources 252-256.

Blocks 318 and 320 of FIG. 4 comprise an internal check accomplished at the source computer 222 that is consistent with an embodiment of the present invention. More particularly, the downgrade activation code is received and processed at block 318. Such processing may include a determination of how many and/or which standby resources are to be included in an entitlement transfer.

In one embodiment that is consistent with the invention, it is determined at block 320 of FIG. 4 whether the resources are actually available for relinquishment. Such a check at block 320 may allow for instances where a standby resource is internally designated critical or otherwise unrelinquishable by an administrator or other user based on its function within the source computer 222. For instance, an administrator may programmatically establish a minimum requirement of standby resources that must remain available on the computer 222 at a given instant. Such a setting may take precedent over an entitlement request. Where no such hold on availability exists at block 320, then the standby resource(s) is relinquished by the source computer 222 at block 322. More particularly, the availability of the standby resource is given up at block 322. In accordance with the principles of the present invention, it is unnecessary to actually transfer the resource, itself, only access to it.

An encrypted credit signature may be generated by the source computer 222 at block 324 in response to the relinquished availability at block 322. Where desired, the signature may be generated automatically and otherwise without user intervention. The signature may be included within a request that also designates a serial number or other identifier associated with the destination computer 212. The request is sent and received by the Web application at blocks 328 and 330, respectively.

The credit signature is verified at block 332. Such verification may be accomplished using known mechanisms, such as two-way encryption software. Where the signature is verified at block 332, the entitlement database may be updated at block 334. That is, the database may be modified to reflect the changed availability status of either or both the destination and source computers 212 and 222, respectively.

A new activation code is generated at block 336. The new activation code may include one or more codes to be sent to either or both the destination and source computers, 212 and 222, respectively. For instance, an activation code may be sent at block 338 of FIG. 4 to the destination computer 212. The destination computer 212 may receive and process the code at block 340. The code may include internal instructions that initiate availability of standby resources 234-238 at block 342.

Where so configured, the activation code generated at block 336 may initiate generation of a fee associated with an entitlement transfer. For instance, where a system 200 is concerned with billing for standby processor usage at block 348, the activation code may be read at block 350 in order to update a usage database used as a basis for billing. In any case, one skilled in the art will appreciate that there exists a virtually limitless number of application scenarios that may be accomplished before an entitlement transfer ends at block 352 in accordance with the principles of the present invention.

Figure 5:
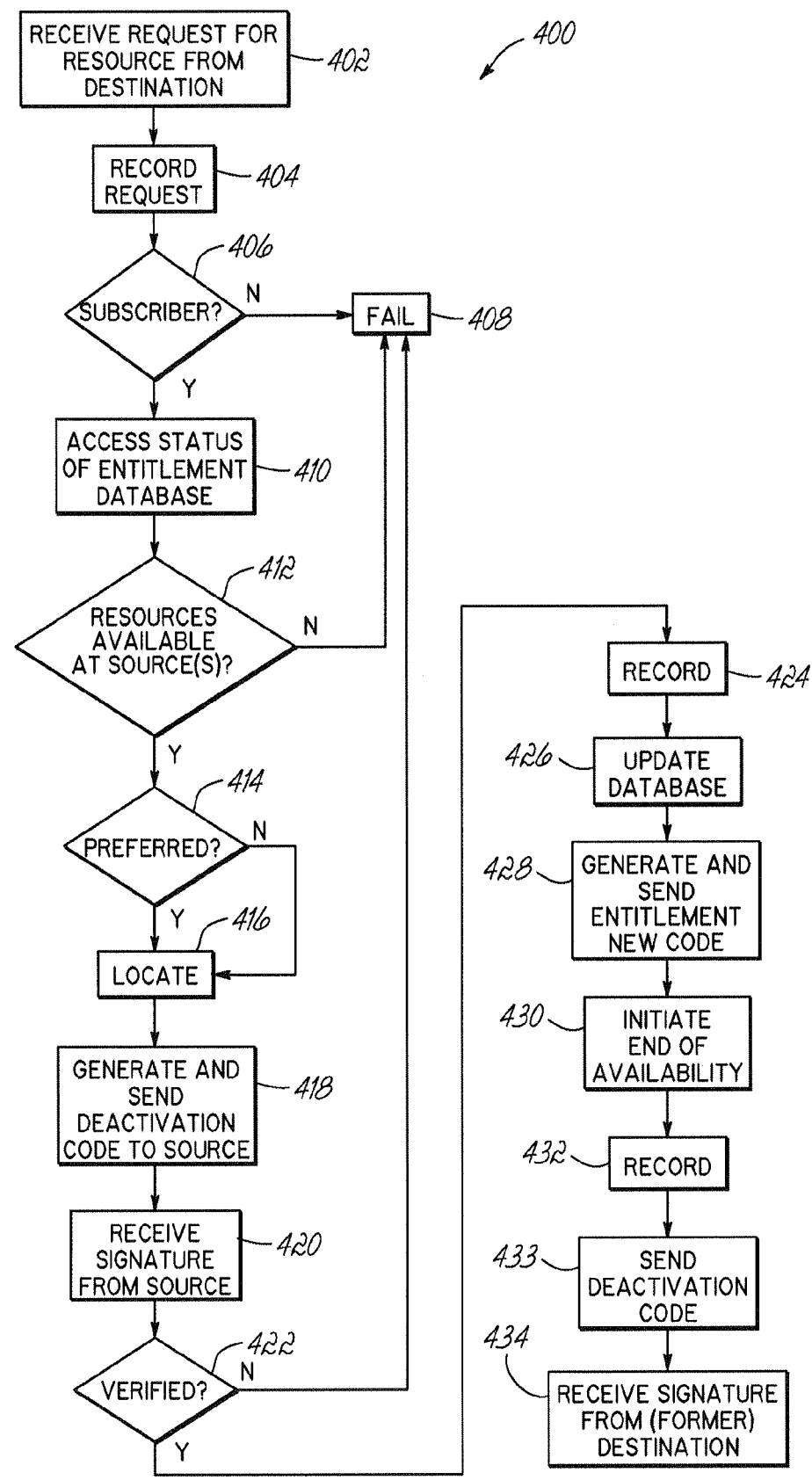
FIG. 5 is a flowchart having exemplary method steps suitable for brokering an entitlement transfer of standby resources within the hardware environment of FIG. 1.

FIG. 5 is a flowchart 400 having a sequence of steps that are executable by the hardware environments of FIGS. 1-3B and that are particularly suited for brokering an entitlement transfer of standby resources in accordance with the principles of the present invention. Different entities may thus be included in a standby resource entitlement transaction. This may allow, for instance, a first entity having access to standby resources to essentially lease or broker standby resources to another user or broker. Such an arrangement may translate into additional revenues and resource utilization. As such, the processes of the flowchart 400 may have particular application in the context of a master/brokerage, or entitlement computer 16 configured to commercially reallocate entitlement to standby resources.

Turning more particularly to block 402 of FIG. 5, the brokerage computer 16 may receive a request for resource enablement from a destination computer 212. Where so configured, the brokerage computer 16 may receive multiple such requests from a plurality of subscribing destination computers. The brokerage computer 16 may record the request at block 404. At block 406, the status of the destination computer 212 as a subscriber or other entity authorized to participate in entitlement transfer processes consistent with the present invention is determined. Where the destination computer 212 is determined to be eligible at block 406, the brokerage machine 16 may access an entitlement database at block 410 of FIG. 5. Such a database may include information pertaining to standby resources that may be relinquished in order to provide the destination computer 212 with standby resource availability. This database may be used to determine at block 412 of FIG. 5 whether an appropriate standby resource is available.

In one embodiment that is consistent with the principles of the present invention, a suitable standby resource for relinquishment may be located according to a preference or programmable scheme at block 414. For example, an administrator may program the broker computer 16 to first attempt to locate a standby resource from a particular source computer 222. Such may be the case where the request at block 402 has been made during a time frame when the standby resource of the source computer 222 is typically not utilized. Such a scenario may occur between destination and source computers operating in different time zones.

At block 416, one or more suitable source computers for purposes of accomplishing an entitlement transfer in accordance with the principles of the present invention are selected. Of interest, a similar determination to locate a suitable destination computer 212 may occur at the onset of another embodiment that is consistent with the principles of the present invention and where the request made at block 402 is from a source computer 222 wishing to sell or otherwise give up its standby resource availability to the brokerage computer 16. In any case, an activation/deactivation code may be generated at block 418 and sent to the located source machine 212 at block 419.

At block 420, the brokerage computer 16 may receive a credit signature in response to the deactivation code transmission at block 418. The brokerage computer 16 may verify the authenticity of the signature at block 422. Such processing at block 422 may include verifying the number of standby resources relinquished. Where so configured, the verification is recorded at block 424. The entitlement database may additionally be updated at block 426 to reflect the new distribution and allotment of available standby resources as between the destination and source computers.

A new entitlement, or activation code is generated and sent at block 428. An exemplary entitlement code is processed by the receiving computer to determine which and/or how many standby resources are to be made available for work. For instance, the activation code may include an electronic key that automatically makes a given standby resource available.

Block 430 represents an event that precipitates the end of a standby resource being available at the destination computer 212. Such an event at block 430 may include expiration of a contracted or otherwise timed allowance. Namely, a count internal to the brokerage computer 16 may indicate that the newly allowed availability of a standby resource should be relinquished. Another exemplary event at block 430 may include a request from a destination or source computer requiring standby resource availability to be recalled. In any case, the event is recorded at 432 and a new activation code may be generated and sent to the (previous) destination computer 212 at block 433 of FIG. 5. In turn, the broker computer 16 will receive a signature from the previous destination computer 212 confirming that availability to the standby resources has been relinquished at block 434. The entitlement database is updated in anticipation of receiving a subsequent request at block 402.

Figure 6:
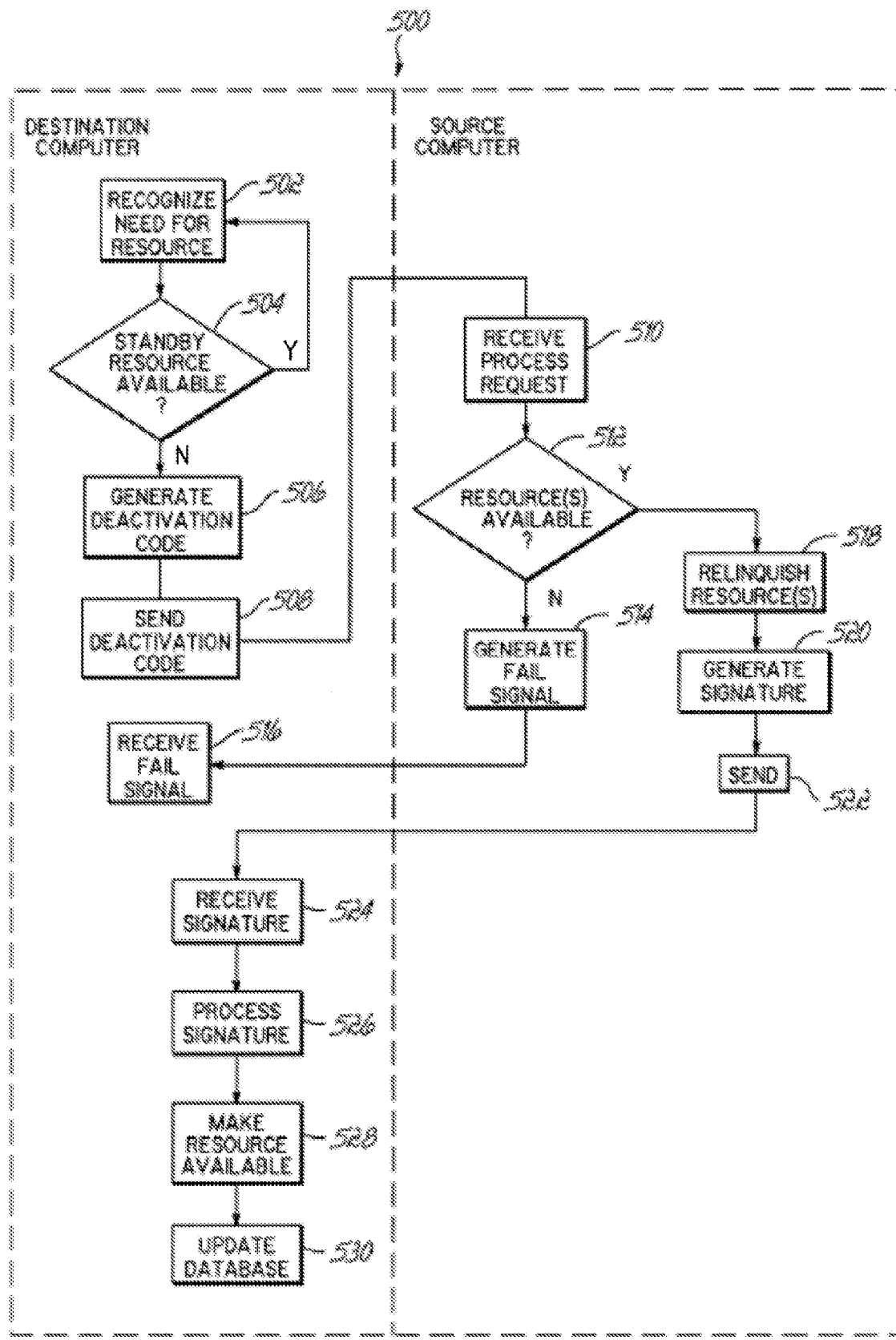
FIG. 6 is a flowchart having exemplary method steps suitable for transferring entitlement to standby resources directly between two computers within the hardware environment of FIG. 1.

FIG. 6 is a flowchart 500 having a sequence of steps suited for transferring entitlement to standby resources directly between two computers in a manner that is consistent with the principles of the present invention. That is, the steps of the flowchart 500 are particularly suited for an entitlement transaction involving only the source and the destination computer. No managing or brokering entity oversees or otherwise facilitates the transaction, as is the case with the embodiments shown in FIGS. 4 and 5. As such, the processes of the flowchart 500 of FIG. 6 are partitioned according to the respective destination or source computers that execute them.

More particularly, a destination computer 212 at block 502 of FIG. 6 may recognize a need for additional resources in order to accomplish an elevated workload, for instance. Where that destination computer 212 has standby resources available at block 504, then the destination computer 222 may initiate generation of a deactivation code at block 506 for removing availability. An exemplary deactivation code may include an instruction that is readable by the source computer 222. The deactivation code sent at block 508 is received and processed at block 510. Such processing may include determining the number of standby resources for which the destination computer 212 would have made available.

At block 512 of FIG. 6, it is determined if the source computer 222 can relinquish availability to the requested number of standby entitlements. Where the source computer 222 cannot transfer entitlements, the destination computer 212 may receive a failure signal at block 516 that has been generated at block 514. Alternatively, the source computer 222 will relinquish access to the standby resources at block 518 where appropriate. The source computer 222 may further generate a signature at block 520 in response to and evidencing the relinquishment.

The signature may be sent to and received by the destination computer 212 at blocks 522 and 524, respectively. The destination computer 212 may process the signature at block 526. Such processing may include decoding and encrypted signal and/or programmatically acknowledging that the source computer 222 has relinquished access to the requested standby resources. In response, those standby resources may be made available to the destination computer 212. At blocks 528 and 530, the internal databases or inventories of the source and destination computers 222 and 212, respectively, may be updated to reflect the new distribution of standby resource availability.

In practice, an on demand transfer website application may be used to request a downgrade of excess capacity on a source computer 222 so that it may be transferred to another, destination computer 212. This destination computer 212 may have standby capacity that has not been enabled. As such, access to the standby resource may be enabled to accomplished an elevated work requirement. The website application may access an entitlement database to credit the source machine 222 an amount equal to the number of standby resources for which it relinquished access. The website application then generates an activation code that reduces the source computer's standby resource entitlement. An activation code, or enablement key is used to disable standby resources of the source computer 222 such that they become automatically available for use to the destination computer 212 upon receipt of the activation code. When this activation code is entered on the source machine 222, the standby resources available to the source computer are reduced. A credit signature generated by the source computer 222 is sent to the website application to verify that the downgrade has been accomplished. The website then generates and sends an activation code to the destination machine 212 that causes a corresponding number of standby resources to be made available to the destination machine. In this manner, an embodiment of the present invention programmatically transfers entitlement to standby resources as between different computer applications.

In this manner, the availability to respective standby resources of computers is reallocated or otherwise transferred to enable greater flexibility. While the aggregate number of available standby resources may remain unchanged, the distribution of the availability may be flexibly reapportioned according to operational requirements. This transfer may be accomplished without requiring physical transfer of a standby resource or a workload associated with a respective computer. This feature thus promotes greater efficiency and cost savings. Additionally, the transfer of entitlemnent may be accomplished automatically and/or dynamically in response to changing workload requirements and resource availability. For example, resources may be switched between the same or different entities operating in different time zones, or in other circumstances where different computers are subjected to peak loads at different times. The credit signatures ensure that standby resources have actually been relinquished and/or made available, and the activation codes automatically update respective availabilities at each computer. Where so configured, an embodiment may include a brokerage or web-based application configured to sell and redistribute standby resource availability to generate additional revenues and operating flexibility.

While the present invention has been illustrated by a description of various embodiments and while these embodiments have been described in considerable detail, it is not the intention of the applicants to restrict, or in any way limit, the scope of the appended claims to such detail. For instance, any of the steps of the above exemplary flowcharts may be deleted, augmented, made to be simultaneous with another or be otherwise altered in accordance with the principles of the present invention.

Furthermore, while computer systems consistent with the principles of the present invention may include virtually any number of networked computers, and while communication between those computers in the context of the present invention may be facilitated by an entitlement application, one skilled in the art will nonetheless appreciate that the processes of the present invention may also apply to direct communication between two computers as in the above example, or even to the internal processes of a single computer. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A method for managing usage of a plurality of standby resources included within a plurality of computers in a capacity on demand computer system, wherein each computer of the plurality of computers includes at least one standby resource of the plurality of standby resources physically dispersed thereto, wherein a source computer among the plurality of computers includes a first plurality of standby resources physically dispersed thereto, a first subset of which are available and a second subset of which are unavailable for use by the source computer, and wherein a destination computer among the plurality of computers includes a second plurality of standby resources physically dispersed thereto, a first subset of which are available and a second subset of which are unavailable for use by the destination computer, the method comprising:

limiting availability to a first standby resource included within the first subset of standby resources in the first plurality of standby resources physically dispersed to the source computer; and in connection with limiting the availability to the first standby resource, programmatically transferring the availability to a second standby resource included within the second subset of standby resources in the second plurality of standby resources physically dispersed to the destination computer such that an aggregate total of standby resources made available to the source and destination computers is maintained after the availability has been transferred, wherein the source and destination computers are geographically dispersed from one another.

2. The method for managing usage of the plurality of standby resources of claim 1, wherein transferring the availability further includes verifying the limiting availability.

3. The method for managing usage of the plurality of standby resources of claim 1, wherein transferring the availability further includes maintaining a physical distribution of the first and second standby resources as between the source and destination computers.

4. The method for managing usage of the plurality of standby resources of claim 1, wherein transferring the availability further includes maintaining respective workloads as between the source and destination computers.

5. The method for managing usage of the plurality of standby resources of claim 1, wherein transferring the availability further includes updating an entitlement database.

6. The method for managing usage of the plurality of standby resources of claim 1, wherein limiting the availability further includes generating a request to downgrade the availability.

7. The method for managing usage of the plurality of standby resources of claim 1, further comprising using an entitlement application computer to manage the usage.

8. The method for managing usage of the plurality of standby resources of claim 1, wherein limiting the availability further includes generating a request to upgrade the availability.

9. The method for managing usage of the plurality of standby resources of claim 1, wherein limiting the availability further includes generating a signature indicative of the availability.

10. The method for managing usage of the plurality of standby resources of claim 1, wherein limiting the availability further includes generating an activation code.

11. The method for managing usage of the plurality of standby resources of claim 1, wherein limiting the availability further includes determining the first standby resource.

12. The method for managing usage of the plurality of standby resources of claim 1, wherein transferring the availability further includes determining the second standby resource.

13. The method for managing usage of the plurality of standby resources of claim 1, wherein transferring the availability further includes generating an activation code.

14. The method for managing usage of the plurality of standby resources of claim 1, wherein transferring the availability further includes storing data associated with the transferring.

15. The method for managing usage of the plurality of standby resources of claim 1, wherein transferring the availability further includes determining an availability status using an entitlement database.

* * * * *